US012783948B2

(12) United States Patent
Nandi et al.

(10) Patent No.: US 12,783,948 B2
(45) Date of Patent: Nov. 3, 2026

(54) PRIVACY-PRESERVING LEARNING AND ANALYTICS OF A SHARED EMBEDDING SPACE ACROSS MULTIPLE SEPARATE DATA SILOS

(71) Applicant: Google LLC, Mountain View, CA (US)

(72) Inventors: Animesh Nandi, Cupertino, CA (US); Liam Charles MacDermed, Millbrae, CA (US)

(73) Assignee: GOOGLE LLC, Mountain View, CA (US)

( * ) Notice: Subject to any disclaimer, the term of this patent is extended or adjusted under 35 U.S.C. 154(b) by 742 days.

(21) Appl. No.: 18/300,926

(22) Filed: Apr. 14, 2023

(65) Prior Publication Data

US 2024/0346367 A1 Oct. 17, 2024

(51) Int. Cl.
*G06N 20/00* (2019.01)

(52) U.S. Cl.
CPC .................................... *G06N 20/00* (2019.01)

(58) Field of Classification Search
CPC ............................................. G06N 3/00–99/00
USPC ...................................................... 706/1–902
See application file for complete search history.

(56) References Cited

U.S. PATENT DOCUMENTS 9,942,255 B1 * 4/2018 MacDermed ....... H04L 63/1466
11,475,161 B2 * 10/2022 Zheng .................. G06N 3/0475
11,847,538 B2 * 12/2023 Cao ....................... G06F 18/214
2021/0166111 A1 * 6/2021 Knighton, Jr ........ G06N 3/0442
2021/0224284 A1 * 7/2021 Kempf .............. G06F 16/24575
2022/0129760 A1 * 4/2022 Ravikumar ......... G06F 21/6245
2022/0284232 A1 * 9/2022 Yin ..................... G06F 18/2413

(Continued)

FOREIGN PATENT DOCUMENTS

WO WO 2021/228404 11/2021
WO WO-2021228404 A1 * 11/2021 ............ G06N 3/047

OTHER PUBLICATIONS

Chanyaswad et al., "RON-Gauss: Enhancing Utility in Non-Interactive Private Data Release.", arXiv:1709.00054v3, Oct. 16, 2018, 21 pages.

(Continued)

*Primary Examiner* — Alan S Miller
(74) *Attorney, Agent, or Firm* — DORITY & MANNING, P.A.

(57) ABSTRACT

Provided are systems and methods for privacy-preserving learning and analytics of a shared embedding space for data split across multiple separate data silos. A central computing system can generate a plurality of synthetic data examples having respective feature data within an aggregate feature-space that represents an aggregation of different component feature-spaces associated with the multiple separate data silos. The synthetic data examples can be used by different computing systems associated with the data silos to generate embeddings within a shared embedding space. Once the embeddings have been generated in the shared embedding space, multiple different types of analytics can be performed on the shared embedding space. As one example, the multiple data silos can correspond to multiple separate entity domains and an analysis of embeddings generated in the shared embedding space can be used to facilitate identification or classification of malicious actors across the multiple separate entity domains.

22 Claims, 11 Drawing Sheets

(56) References Cited

U.S. PATENT DOCUMENTS

| | | | | |
|---|---|---|---|---|
| 2022/0300618 | A1* | 9/2022 | Ding | G06N 5/01 |
| 2022/0398500 | A1* | 12/2022 | Singhal | G06N 3/098 |
| 2023/0137378 | A1* | 5/2023 | LaTERZA | G06F 40/40 726/26 |
| 2023/0351736 | A1* | 11/2023 | Choi | G06V 20/58 |
| 2024/0111894 | A1* | 4/2024 | Kreis | G06N 3/084 |

OTHER PUBLICATIONS

Charikar, "Similarity Estimation Techniques from Rounding Algorithms.", Symposium on Theory of Computing, May 19-21, 2002, Montreal, Quebec, Canada, May 19-21, 2002, 9 pages.
Duddu et al., "Quantifying Privacy Leakage in Graph Embedding.", arXiv:2010.00906v2, Apr. 26, 2021, 10 pages.
Erlingsson et al., "RAPPOR: Randomized Aggregatable Privacy-Preserving Ordinal Response.", CCS '14: Twenty-first Association for Computing Machinery Special Interest Group on Security, Audit and Control Conference on Computer and Communications Security, Nov. 3-7, 2014, pp. 1054-1067.
Gambs et al., "Growing Synthetic Data through Differentially-Private Vine Copulas.", Proceedings on Privacy Enhancing Technologies, vol. 3, Apr. 27, 2021, pp. 122-141.
Jordon et al., "PATE-GAN: Generating Synthetic Data with Differential Privacy Guarantees.", International Conference on Learning Representations, Vancouver, British Columbia, Canada, Apr. 30-May 3, 2018, pp. 1-21.
Nandi et al., "On the Use of Decentralization to Enable Privacy in Web-Scale Recommendation Services.", WPES '13: Twelfth Association for Computing Machinery Workshop on Privacy in the Electronic Society, Nov. 4, 2013, pp. 25-36.
Nandi et al., "P3: A Privacy Preserving Personalization Middleware for Recommendation-Based Services.", Fourth Hot Topics in Privacy Enhancing Technologies Symposium (HotPETS 2011), Jul. 29, 2011, 12 pages.
Song et al., "Information Leakage in Embedding Models.", arXiv:2004.00053v2, Aug. 19, 2020, 14 pages.
Song et al., "Information Leakage in Embedding Models.", CCS '20: 2020 ACM Special Interest Group on Security, Audit and Control Conference on Computer and Communications Security, Virtual, Nov. 9-13, 2020, pp. 377-390.
Tensorflow.org, "The StatisticsGen TEX Pipeline Component.", May 20, 2021, https://www.tensorflow.org/tfx/guide/statsgen, retrieved on Jun. 15, 2023, 2 pages.
Zhang et al., "PrivBayes: Private Data Release via Bayesian Networks.", Association for Computing Machinery Transactions on Database Systems, vol. 42, Issue 4, Article No. 25, pp. 1-41.
International Search Report and Written Opinion for Application No. PCT/US2023/031500, mailed Dec. 20, 2023, 12 pages.
International Preliminary Report on Patentability for Application No. PCT/US2023/031500, mailed Oct. 23, 2025, 8 pages.

* cited by examiner

PRIVACY-PRESERVING LEARNING AND ANALYTICS OF A SHARED EMBEDDING SPACE ACROSS MULTIPLE SEPARATE DATA SILOS

FIELD

The present disclosure relates generally to learning of embeddings corresponding to items. More particularly, the present disclosure relates to privacy-preserving learning of a shared embedding space for data stored across multiple separate data silos.

BACKGROUND

In the context of machine learning or other domains of data science, the term "embedding" can refer to a numerical data element (e.g., expressed as a vector or other array of floating-point numbers) which represents an item or set of items within a latent embedding space. The latent embedding space can be a d-dimensional vector space to which features from a different (typically higher-dimensional) vector space are able to be mapped. Typically, the embedding space contains a semantically-meaningful structure. For example, a measure of distance (e.g., the dot product or cosine similarity) computed between two embeddings for two items in the same embedding space may indicate a relative similarity between the two items.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to facilitate privacy-preserving learning of embeddings. The method includes receiving, by a central computing system comprising one or more computing devices, data descriptive of a respective data distribution within each of a plurality of different component feature-spaces that are respectively associated with a plurality of different and separate data silos. The method includes aggregating, by the central computing system, the data descriptive of the data distributions within the plurality of different component feature-spaces to generate an aggregate data distribution for an aggregate feature-space. The method includes sampling, by the central computing system, from the aggregate data distribution for the aggregate feature-space to generate a plurality of synthetic data examples having respective feature data within the aggregate feature-space. The method includes providing, by the central computing system, the plurality of synthetic data examples to a plurality of silo computing systems respectively associated with the plurality of different and separate data silos for use in generation, by the silo computing systems, of embeddings within a shared embedding space.

Another example aspect of the present disclosure is directed to a silo computing system comprising one or more computing devices configured to perform operations. The operations include determining data descriptive of a data distribution within a component feature-space of a data silo associated with the silo computing system, wherein the data silo stores a collection of data examples associated with one or more entities. The operations include transmitting the data descriptive of respective data distribution to a central computing system for use in generating an aggregate feature-space, wherein the aggregate feature-space comprises an aggregation of the component feature-space with one or more other component feature-spaces of one or more different data silos that are separate from the data silo. The operations include receiving a plurality of synthetic data examples having respective feature data within the aggregate feature-space. The operations include generating one or more embeddings respectively for the one or more entities based at least in part on the collection of data examples and the plurality of synthetic data examples.

Another example aspect of the present disclosure is directed to a central computing system implemented by one or more computing devices. The central computing system is configured to perform operations. The operations include receiving, by a central computing system comprising one or more computing devices, data descriptive of a respective data distribution within each of a plurality of different component feature-spaces that are respectively associated with a plurality of different and separate data silos. The operations include aggregating, by the central computing system, the data descriptive of the data distributions within the plurality of different component feature-spaces to generate an aggregate data distribution for an aggregate feature-space. The operations include training, by the central computing system, an embedding generation model based on the aggregate data distribution for the aggregate feature-space. The operations include providing, by the central computing system, the embedding generation model to a plurality of silo computing systems respectively associated with the plurality of different and separate data silos for use in generation, by the silo computing systems, of embeddings within a shared embedding space.

Another example aspect of the present disclosure is directed to a silo computing system comprising one or more computing devices configured to perform operations. The operations include determining data descriptive of a data distribution within a component feature-space of a data silo associated with the silo computing system, wherein the data silo stores a collection of data examples associated with one or more entities. The operations include transmitting the data descriptive of respective data distribution to a central computing system for use in generating an aggregate feature-space, wherein the aggregate feature-space comprises an aggregation of the component feature-space with one or more other component feature-spaces of one or more different data silos that are separate from the data silo. The operations include receiving an embedding generation model trained using the aggregate feature-space. The operations include generating one or more embeddings respectively for the one or more entities by applying the embedding generation model to the collection of data examples stored in the data silo.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1A:
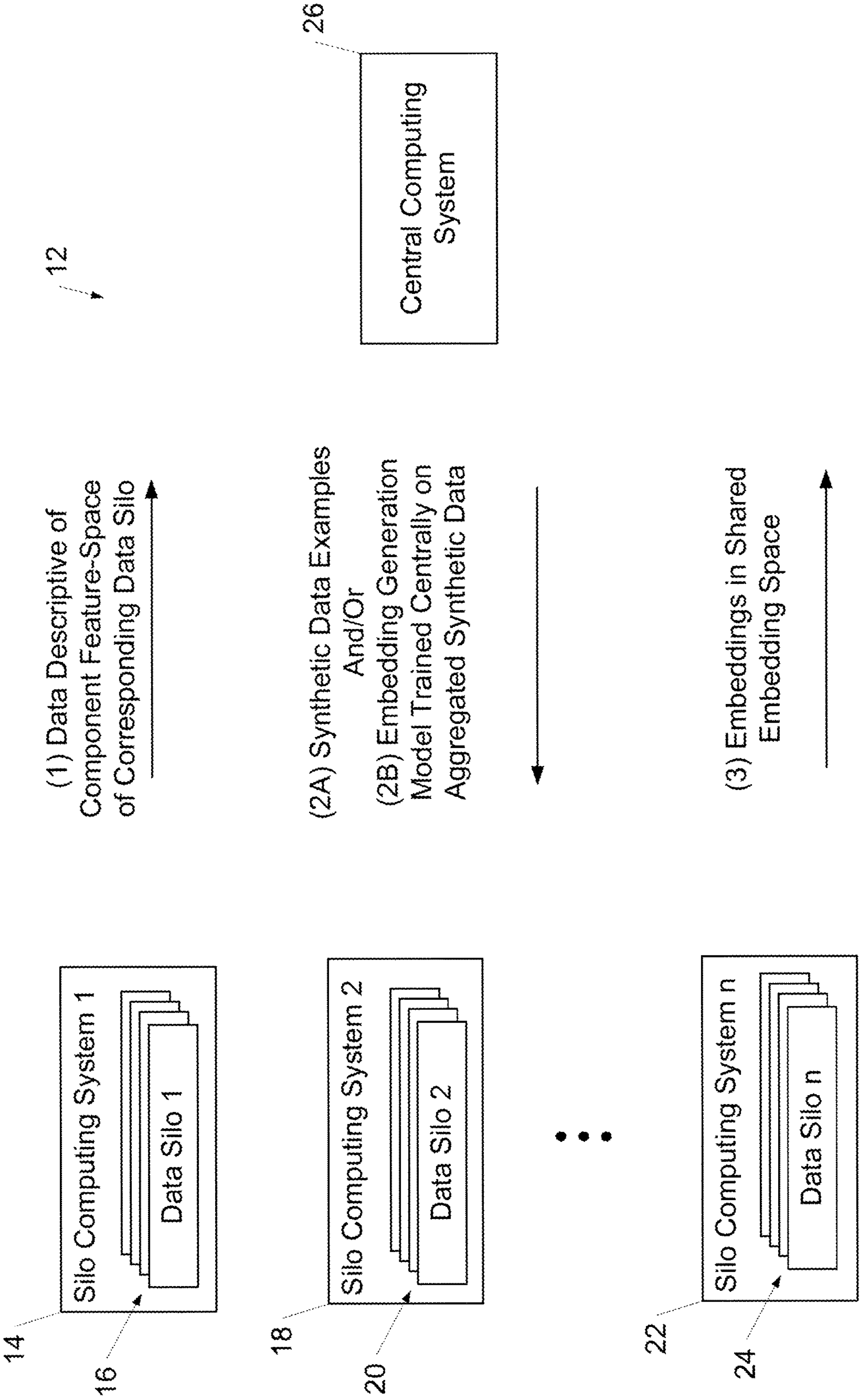
FIG. 1A depicts a block diagram of an example computing environment for generation of embeddings in a shared embedding space according to example embodiments of the present disclosure.

As a general summary, the present disclosure is directed to privacy-preserving learning of a shared embedding space for data split across multiple separate data silos. According to an aspect of the present disclosure, each of a number of silo computing systems respectively associated with the multiple separate data silos can provide to a central computing system data descriptive of a respective data distribution within its associated data silo. For example, the data descriptive of a respective data distribution for each data silo can include silo-specific synthetic data examples generated using a differentially-private generative model. The central computing system can aggregate the data received from the silo computing systems to generate a plurality of synthetic data examples within an aggregate feature-space that represents an aggregation of the different component feature-spaces associated with the multiple separate data silos. In one example, the central computing system can transmit the synthetic data examples to the silo computing systems and the silo computing systems can use the received synthetic data examples to train embedding generation models and generate embeddings within a shared embedding space. In another example, the central computing system can centrally train a single embedding generation model on the aggregated synthetic data examples and then provide the trained model to the silo computing systems for use in generating embeddings. Once the embeddings have been generated in the shared embedding space, multiple different types of analytics can be performed on the shared embedding space. As one example of such an analytics use case, the multiple data silos can correspond to multiple separate entity domains and an analysis of embeddings generated in the shared embedding space can be used to facilitate identification or classification of malicious actors across the multiple separate entity domains.

As a more detailed explanation, various settings exist in which data examples associated with the same or different items are held or maintained in a plurality of different data silos that are separate from each other. For example, the multiple separate data silos can correspond to a "semi-federated" learning setting. In some instances, the semi-federated learning setting is also referred to as a cross-silo federated-learning setup. This semi-federated setting can be contrasted with a centralized data setting in which all data examples for all items are collected and held together by a central entity. The semi-federated learning setting can also be contrasted with a fully federated learning setting in which the data is completely distributed, such that each computing device contains data for only a single item.

An item can be any item, object, or entity, such as a product (e.g., movie, book, item of clothing, etc.), a document (e.g., a webpage, a data file, etc.), or entity (e.g., a user or user account, a location, a business, a point of interest, etc.). Data associated with item(s) can be stored in a data silo as one or more data example(s). A data example can refer to a data entry that is associated with a particular item and that includes feature values for a set of features. In machine learning, a "feature" refers to a variable for which feature values are or can be recorded. The set of different features for which data exists in a particular collection of data examples can define or be referred to as the "feature-space" for such collection of data examples.

The term "data silo" can refer to a data storage system (e.g., including or leveraging one or more databases or other physical data storage apparatus) that stores a collection of data examples that are held separate from data examples stored in another data silo. For example, data examples stored by one data silo may be kept physically and/or logically separate from data examples stored by another data silo. For example, two collections of data examples held in two data silos may be stored such that they are not mixed or cross-referenced. A silo computing system refers to a computing system that operates to implement a particular data silo or operates in conjunction with a particular data silo. The storage of data examples in multiple different data silos may be driven by various operational and/or regulatory constraints.

The storage of data examples in multiple different data silos generates a number of technical challenges as relates to the generation of embeddings by the silo computing systems. In particular, because the data examples are held in different data silos, and because of random rotations which naturally occur during the generation of embeddings, existing approaches for the generation of embeddings will result in the generation of respective embedding spaces that are not able to be meaningfully combined or interpretable with respect to each other. In particular, each respective silo computing system can generate embeddings for the items represented within its respective data examples. However, because of the aforementioned random rotations which occur during generation of embeddings, the embeddings and associated embedding space generated by one silo computing system on its data silo will not share a semantic structure with the embeddings and associated embedding space generated by another silo computing system on its data silo.

The present disclosure provides a technical solution to the above challenge by enabling the privacy-preserving generation of embeddings in a shared embedding space from data split across multiple separate data silos. In particular, the present disclosure provides a system in which a central computing system generates synthetic data examples that can be used by respective silo computing systems to generate embeddings from or for their respective data silos in a shared embedding space.

More particularly, according to an aspect of the present disclosure, a central computing system can receive data descriptive of a respective data distribution within each of a plurality of different component feature-spaces that are respectively associated with a plurality of different and separate data silos. For example, each silo computing system associated with one of the data silos can train a differentially-private generative model on the data contained in the corresponding silo. The silo computing system can then use the differentially-private generative model to generate a respective plurality of silo-specific synthetic data examples that are representative of the respective data distribution in the corresponding data silo. These silo-specific synthetic data examples can be sent to the central computing system to provide a privacy-preserving representation of the data within the component feature-space of the corresponding data silo.

The central computing system can aggregate the plurality of different component feature-spaces to generate an aggregate feature-space. For example, the central computing system can aggregate the respective sets of silo-specific synthetic data examples received from the silo computing systems to generate a centralized set of aggregated synthetic data. In some example settings in which there is partial feature-space fragmentation among two or more of the data silos, aggregating the plurality of different component feature-spaces can also include inserting feature values (e.g., null values or average values) for data examples that did not previously have feature values for a particular feature.

In some implementations, the central computing system can then generate a plurality of synthetic data examples having respective feature data within the aggregate feature-space. As one example, the central computing system can sample a subset of data examples from the aggregated set of all silo-specific synthetic data examples. For example, the sampling can be performed via random sampling or by a more careful selection of diverse random samples across the aggregate feature-space. These sampled data examples can serve as the plurality of synthetic data examples. In another example, an additional generative model can be trained on the aggregated set of all silo-specific synthetic data examples and used to generate the plurality of synthetic data examples. In yet another example, the aggregated set of all silo-specific synthetic data examples can serve as the plurality of synthetic data examples (e.g., no subsampling is performed).

According to one example approach, in some implementations, the central computing system can then provide the plurality of synthetic data examples to the silo computing systems. Each silo computing system can use the plurality of synthetic data examples and the respective data examples in its corresponding data silo to generate embeddings for items represented within the corresponding data silo.

In this example approach, because each silo computing system uses the synthetic data examples received from the central computing system when generating its respective embeddings, the resulting embeddings will be expressed within a shared embedding space having a consistent semantic structure. Therefore, the embeddings generated from each data silo can be semantically-interpretable with respect to embeddings generated from the other data silos following a transformation (e.g., performed by the central computing system) to re-align the respective embedding spaces. For example, the central computing system can perform one or more drift-minimization techniques to transform each embedding space to minimize the embedding-drifts across the embeddings learnt for the same synthetic data examples.

According to another example approach, in some implementations, the central computing system can train an embedding generation model based on the aggregate data distribution for the aggregate feature-space. For example, the embedding generation model can be trained on the plurality of synthetic data examples from the aggregate feature-space. The central computing system can then provide the embedding generation model to a plurality of silo computing systems respectively associated with the plurality of different and separate data silos for use in generation, by the silo computing systems, of embeddings within a shared embedding space. In particular, because each silo computing system uses the same embedding generation model received from the central computing system when generating its respective embeddings, the resulting embeddings will be expressed within a shared embedding space having a consistent semantic structure. Further, because a single embedding generation model was used, even the absolute-values of the embedding-space are consistent. Therefore, the embeddings can be analyzed even without transformation of the embedding spaces (e.g., without performing drift-minimization techniques).

Embeddings generated within the shared embedding space can be used for various purposes, including, as examples, same item detection, classification, and/or clustering across data silos. However, because the embeddings in the shared embedding space were generated without providing access to the underlying raw feature data (i.e., the data examples in the data silos remained separate), the proposed approach preserves the privacy of the data examples (e.g., and avoids violating various operational and/or regulatory constraints).

The systems and methods of the present disclosure provide a number of technical effects and benefits. As one example, the proposed techniques enable the creation of embeddings in a shared embedding space from data examples held in multiple data silos, while preserving the privacy of the underlying data examples. Therefore, the proposed approach provides the ability to generate embeddings in a shared embedding space with improved user privacy (e.g., as compared to an approach that uses wholly centralized sharing of the data examples for embedding generation). Furthermore, the proposed approach represents an improvement in the functionality of a computing system, which previously was not able to create embeddings in a shared embedding space without having centralized access to all of the underlying data examples.

With reference now to the Figures, example embodiments of the present disclosure will be discussed in further detail.

FIG. 1A depicts a block diagram of an example computing environment 12 for generation of embeddings in a shared embedding space according to example embodiments of the present disclosure. The computing environment 12 can include a central computing system 26 and a plurality of silo computing systems (e.g., silo computing systems 14, 18, and 22). Each silo computing system 14, 18, 22 can include, implement, or otherwise be associated with a particular data silo of a plurality of data silos 16, 20, 24. As examples, silo computing system 14 is associated with data silo 16; silo computing system 18 is associated with data silo 20; and silo computing system 22 is associated with data silo 24.

Each data silo 16, 20, 24 can store a collection of data examples. Each data example can be associated with a particular item and can include feature data for one or more features. An item can be any item, object, or entity, such as a product (e.g., movie, book, item of clothing, etc.), a document (e.g., a webpage, a data file, etc.), or entity (e.g., a user or user account, a location, a business, a point of interest, etc.). A feature can be a variable for which feature values are or can be recorded. The set of different features for which data exists in a particular collection of data examples can define or be referred to as the "feature-space" for such collection of data examples.

Each data silo 16, 20, 24 can be or include a data storage system (e.g., including or leveraging one or more databases or other physical data storage apparatus) that stores a collection of data examples that are held separate from data examples stored in another data silo. For example, data examples stored by data silo 16 may be kept physically and/or logically separate from data examples stored by data silo 20. For example, the two collections of data examples respectively held in data silos 16 and 20 may be stored such that they are not mixed or cross-referenced.

Each silo computing system 14, 18, 22 can be or include a computing system that operates to implement a particular data silo or operates in conjunction with a particular data silo. The storage of data examples in multiple different data silos may be driven by various operational and/or regulatory constraints.

As one example, the multiple data silos 16, 20, 24 can correspond to or be a result of data fragmentation in the feature-space. For example, the multiple data silos 16, 20, 24 may hold data representative of the same (or at least some of the same) items (e.g., entities such as users), but may have data for each item that is expressed according to different respective sets of features. Stated differently, two data silos may store data examples for at least some of the same items but may have different respective feature-spaces. One example of feature-space fragmentation can occur when two systems associated with two different software applications hold data examples for the at least some of same users, but the respective data examples for each application contain data for different sets of features (e.g., application A may collect feature data for feature A, while application B collects feature data for feature B).

In another example, the multiple data silos 16, 20, 24 can correspond to or be a result of data fragmentation in the entity-space. For example, the multiple data silos 16, 20, 24 may hold data representative of different items (e.g., entities such as users), but may have data for each item that is expressed according to the same set of features (i.e., the same feature-space). One example of entity-space fragmentation can occur when a software application holds data examples for different users in separate data silos based on the geographic location of the user (e.g., data for users in geographic region A may be held in data silo A while data for users in geographic region B is held in data silo B, with the same features used in both silo A and silo B).

Of course, many settings exist which represent or demonstrate a mix of both feature-space fragmentation and entity-space fragmentation. Different examples of these settings are illustrated in FIGS. 1C-D and will be discussed in further detail below. However, referring still to FIG. 1A, the present disclosure provides a solution that enables privacy-preserving generation of embeddings in a shared embedding space in the environment 12 shown in FIG. 1A, regardless of whether the data silos 16, 20, 24 correspond to feature-space fragmentation and/or entity-space fragmentation.

In particular, according to an aspect of the present disclosure, each silo computing system 14, 18, 22 can generate data descriptive of the component feature-space of the corresponding data silo. For example, silo computing system 14 can generate data descriptive of the component feature-space associated with data silo 16. As shown at transmission (1), each silo computing system 14, 18, 22 can transmit the data descriptive of its component feature-space to the central computing system 26.

Each silo computing system 14, 18, 22 can perform a number of different techniques to generate the data descriptive of the respective data distribution. For example, these techniques can include the generation of synthetic data that provides information about distribution of data within the data silo; but which does not reveal the underlying data itself.

One example class of techniques that can be performed to generate the distribution data is Bayesian model learning approaches. One example of this class of technique is the Differentially Private version of Bayesian model learning described in Zhang et al., PrivBayes: Private Data Release via Bayesian Networks. In *ACM Transactions on Database Systems*, Vol. 1, No. 1, Article 1. Publication date: September 2017.

Another example class of techniques that can be performed to generate the distribution data is Gaussian Mixture Models Parameter learning on Orthonormal Projections. One example of this class of technique is the Differentially Private algorithm described in Chanyswad et al., RON-Gauss: Enhancing Utility in Non-Interactive Private Data Release. In *Proceedings on Privacy Enhancing Technologies;* 2019 (1):26-46.

Another example class of techniques that can be performed to generate the distribution data is Joint-Probability Learning. One example of this class of technique is the Differentially Private algorithm described in Gambs et al., Growing synthetic data through differentially-private vine copulas. *Proceedings on Privacy Enhancing Technologies;* 2021 (3):122-141.

Another example class of techniques that can be performed to generate the distribution data includes the use of Generative Adversarial Models (GANs). One example of this class of technique is the Differentially Private algorithm described in Jordon et al., PATE-GAN: Generating Synthetic Data with Differential Privacy Guarantees. In *International Conference on Learning Representations* (ICLR) 2019.

The present disclosure represents a novel use of the above described techniques for the purpose of generation of a shared embedding space.

Referring still to FIG. 1, the central computing system 26 can receive (e.g., from the silo computing systems 14, 18, 22 associated with the different data silos 16, 20, 24) the data descriptive of a plurality of different component feature-spaces that are respectively associated with the plurality of different data silos 16, 20, 24. The central computing system 26 can aggregate the plurality of different component feature-spaces to generate an aggregate feature-space.

According to another aspect of the present disclosure, the central computing system 26 can generate a plurality of synthetic data examples having respective feature data within the aggregate feature-space.

In one example approach, as shown at transmission 2A of FIG. 1, the central computing system 26 can provide the plurality of synthetic data examples to the silo computing systems 14, 18, 22.

Each silo computing system 14, 18, 22 can use the plurality of synthetic data examples and the respective data examples in its corresponding data silo 16, 20, 24 to generate embeddings for items represented within the corresponding data silo 16, 20, 24. For example, silo computing system 14 can generate embeddings for items represented by data within data silo 16 based on the synthetic data examples and based on the data examples within data silo 16. Likewise, silo computing system 18 can generate embeddings for items represented by data within data silo 20 based on the synthetic data examples and based on the data examples within data silo 20.

Because each silo computing system 14, 18, 22 used the synthetic data examples received from the central computing system 26 when generating its respective embeddings, the resulting embeddings will be expressed within a shared embedding space having a consistent semantic structure. Therefore, the embeddings generated from each data silo 16, 20, 24 can be semantically-interpretable with respect to embeddings generated from the other data silos 16, 20, 24 following a transformation (e.g., performed by the central computing system 26) to re-align the respective embedding spaces. For example, the central computing system 26 can perform one or more drift-minimization techniques to transform each embedding space to minimize the embedding-drifts across the embeddings learnt for the same synthetic data examples.

In another example approach, as shown at transmission 2B of FIG. 1, the central computing system 26 can provide a trained embedding generation model to the silo computing systems 14, 18, and 22. The trained embedding generation model can have been trained on the aggregated data in the aggregate feature-space.

Each silo computing system 14, 18, 22 can use the trained embedding generation model and the respective data examples in its corresponding data silo 16, 20, 24 to generate embeddings for items represented within the corresponding data silo 16, 20, 24.

Because each silo computing system 14, 18, 22 used the same embedding generation model received from the central computing system 26 when generating its respective embeddings, the resulting embeddings will be expressed within a shared embedding space having a consistent semantic structure. Therefore, the embeddings generated from each data silo 16, 20, 24 will be semantically-interpretable with respect to embeddings generated from the other data silos 16, 20, 24. Further, because a single embedding generation model was used, the embeddings can be analyzed even without transformation of the embedding spaces (e.g., without performing drift-minimization techniques), as even the absolute-values of the embedding-space are consistent.

Referring still to FIG. 1A, in some implementations, once embeddings have been generated by each of the silo computing systems 14, 18, 22, each silo computing system 14, 18, 22 can provide the embeddings generated in the shared embedding space to the central computing system 26, e.g., as shown at transmission (3). The central computing system 26 can use the embeddings generated within the shared embedding space for various purposes, including, as examples, same item detection, classification, and/or clustering across data silos. In some implementations, prior to performing analytical actions on the embeddings, the central computing system 26 can perform one or more drift-minimization techniques to re-orient the embeddings received from the silo computing systems 14, 18, 22 to have a consistent orientation. In other implementations, each silo computing system 14, 18, 22 does not share the embeddings with the central computing system 26. Instead, other federated analysis techniques can be performed on the embeddings distributed at the different silo computing systems 14, 18, 22.

Because the embeddings in the shared embedding space were generated without providing the central computing system 26 with access to the underlying raw feature data, the proposed approach preserves the separate nature of the data silos 16, 20, 24 and therefore improves the privacy afforded to the underlying data and/or complies with various operational and/or regulatory constraints.

In some implementations, the arrangement shown and described with reference to FIG. 1A can be referred to as a "semi-federated" setting, in which some data (e.g., the raw data examples stored in the data silos) is not shared centrally; while other data (e.g., embeddings generated from the data examples) is shared centrally. This "semi-federated" setting may, in some cases, represent an additional tradeoff option that enables improved computational behavior and efficiency (e.g., via analysis of the shared embeddings) while preserving the privacy of the underlying data examples.

Each of the silo computing systems 14, 18, 22 and the central computing system 26 can include or be implemented by one or more computing devices. Example computing devices include server computing devices. As one example, each of the silo computing systems 14, 18, 22 can correspond to one or more application servers. Example computing devices also include user computing devices. As one example, each of the silo computing systems 14, 18, 22 can correspond to one or more user computing devices such as smartphones, laptops, tablets, Internet of Things devices, gaming consoles, etc. An example computing device is described with reference to FIG. 4.

Figure 1B:
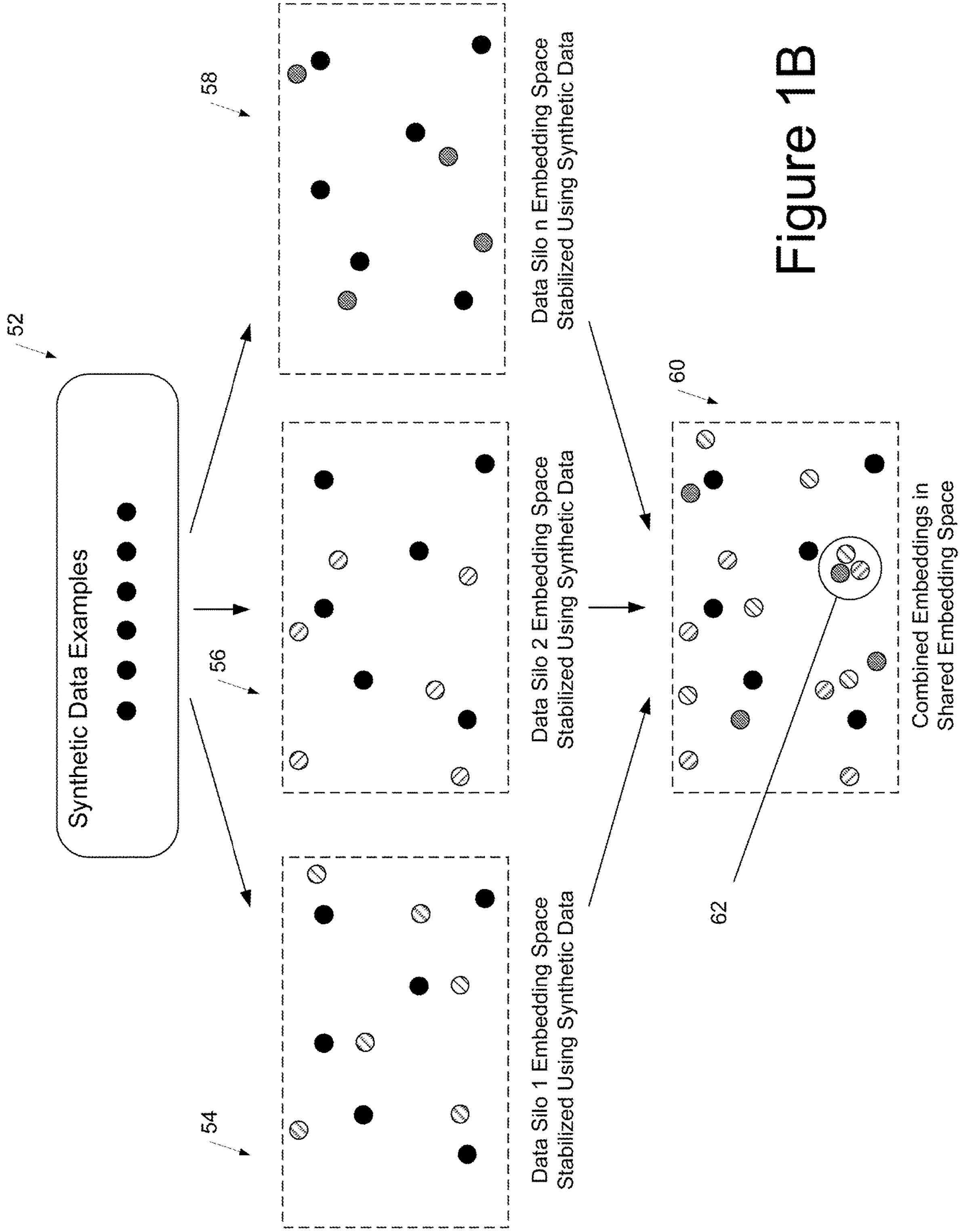
FIG. 1B depicts a graphical diagram of an example process for generation of embeddings in a shared embedding space according to example embodiments of the present disclosure.
Figure 1C:
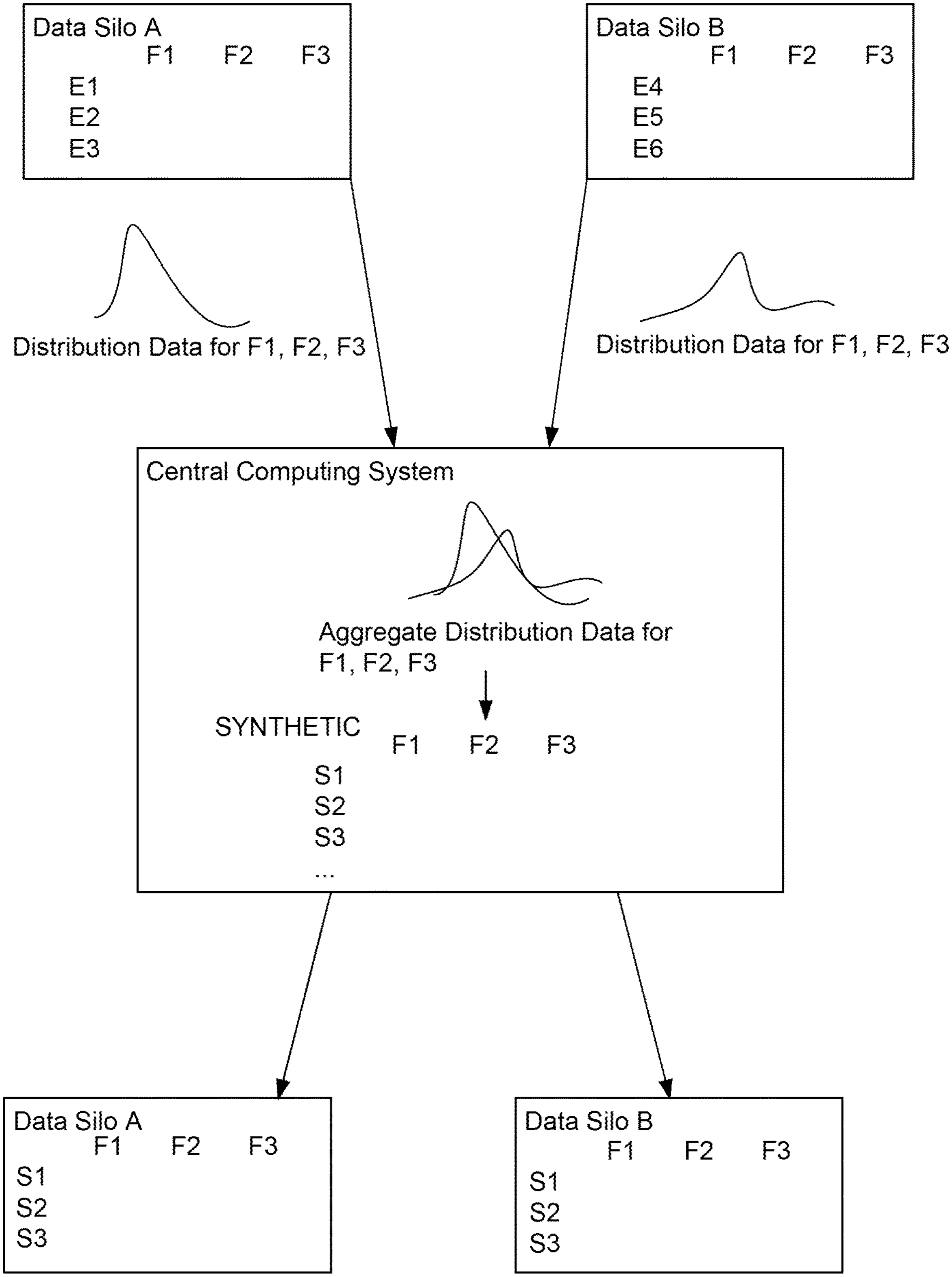
FIG. 1C depicts a graphical diagram of an example application to an example setting that contains only entity-space fragmentation according to example embodiments of the present disclosure.
Figure 1D:
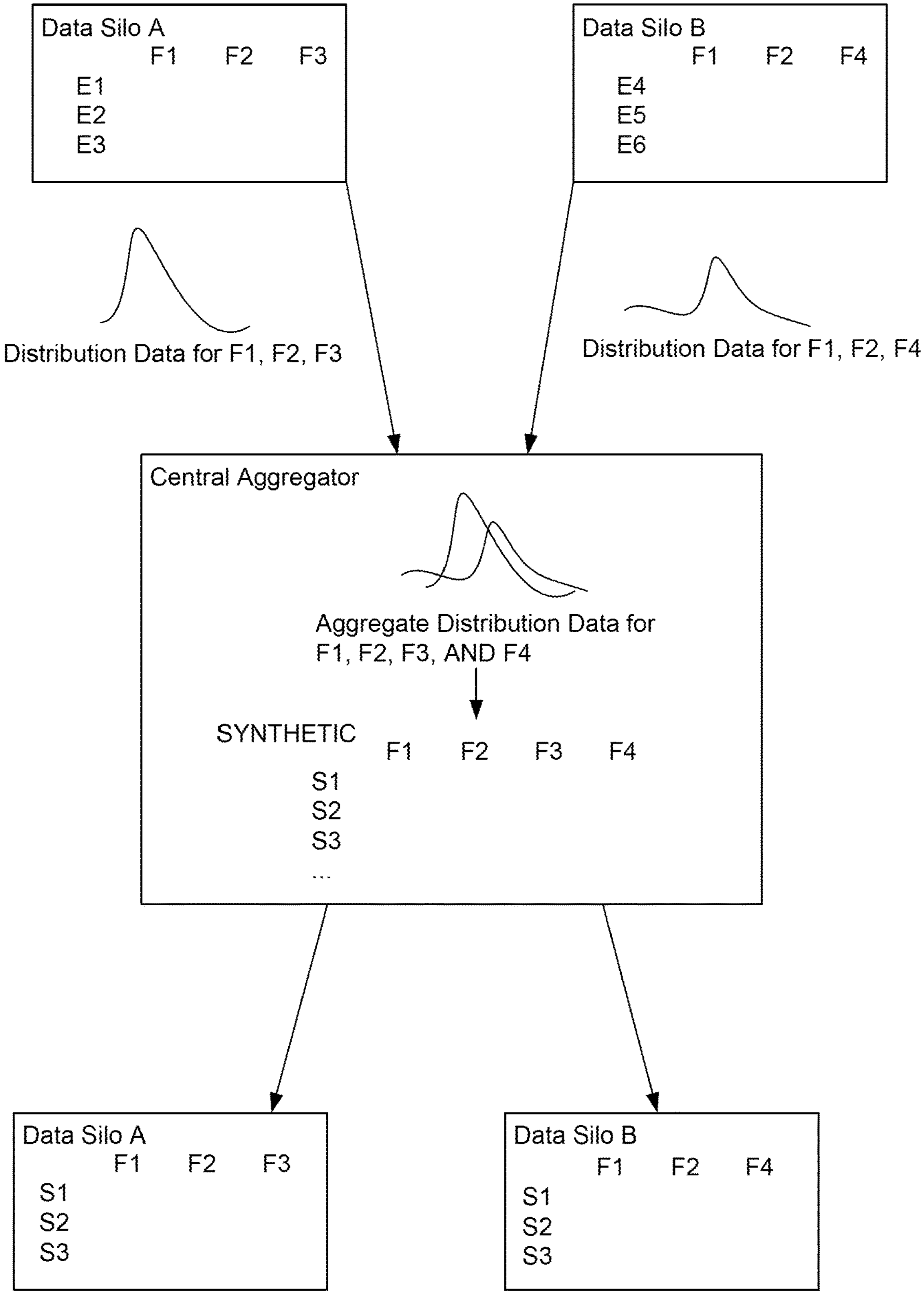
FIG. 1D depicts a graphical diagram of an example application to an example setting that contains entity-space fragmentation and partial feature-space fragmentation according to example embodiments of the present disclosure.

FIG. 1B depicts a graphical diagram of one example of the above-described process for generation of embeddings in a shared embedding space according to example embodiments of the present disclosure.

Specifically, FIG. 1B illustrates a set of synthetic data examples 52 generated in an aggregate feature-space. The synthetic data examples 52 are provided to each of a plurality of silo computing systems respectively associated with a plurality of data silos.

As illustrated in FIG. 1B, the synthetic data examples 52 are used to stabilize and consistently orient the embedding space generated by or for each data silo, including, for example, the embedding space 54 for data silo 1, the embedding space 56 for data silo 2, and the embedding space 58 for data silo n.

The per-data-silo stabilized embeddings (e.g., which may optionally be differentially privacy noised before exporting) can be merged together to generate combined embeddings 60 in a shared embedding space. Embedding analysis can be performed in the shared embedding space to generate insights into the data across data silos. For example, a cluster 62 can be detected that would not have been detected if the embedding spaces across the data silos were not stabilized or otherwise made to have a shared semantic structure as described herein.

FIG. 1C depicts a graphical diagram of an example application to an example setting that contains complete entity-space fragmentation and zero feature-space fragmentation according to example embodiments of the present disclosure. In particular, as shown in FIG. 1C, Data Silo A contains data examples for entities E1, E2, and E3. Each data example contains data values for features F1, F2, and F3. Data Silo B contains data examples for a different set of entities E4, E5, and E6. Each data example contains data values for features F1, F2, and F3. Therefore, in this setting, the data silos A and B have complete entity-space fragmentation (e.g., the entity sets are mutually disjoint across the silos), but no feature-space fragmentation.

As shown in FIG. 1C, each of the data silos can provide distribution data to the central computing system. The central computing system can generate synthetic data examples for the aggregate feature-space. In particular, the central computing system generates synthetic data examples for synthetic entities S1, S2, and S3. Each data example contains data values for features F1, F2, and F3. The synthetic data examples can, in one example approach, be sent to each of the data silos A and B.

FIG. 1D depicts a graphical diagram of an example application to an example setting that contains entity-space fragmentation and partial feature-space fragmentation according to example embodiments of the present disclosure. For example, the setting demonstrates partial feature-space fragmentation because not all silos contain the identical list of feature columns, but at least two silos have at least some overlap. In particular, as shown in FIG. 1D, Data Silo A contains data examples for entities E1, E2, and E3. Each data example contains data values for features F1, F2, and F3. Data Silo B contains data examples for entities E4, E5, and E6. Each data example contains data values for features F1, F2, and F4. Therefore, in this setting, the data silos A and B have complete entity-space fragmentation and also partial feature-space fragmentation.

As shown in FIG. 1D, each of the data silos can provide distribution data to the central computing system. The central computing system can generate synthetic data examples for the aggregate feature-space. In particular, the central computing system generates synthetic data examples for synthetic entities S1, S2, and S3. Each data example contains data values for features F1, F2, F3, and F4. In some examples in this setting, aggregating the plurality of different component feature-spaces can also include inserting (e.g., imputing) feature values (e.g., null values or average values) for data examples that did not previously have feature values for a particular feature.

The synthetic data examples can, in one example approach, be sent to each of the data silos A and B. For example, as shown in FIG. 1D, the data for features F1, F2, and F3 (but not F4) can be sent to Data Silo A, while the data for features F1, F2, and F4 (but not F3) can be sent to Data Silo B.

Figure 2A:
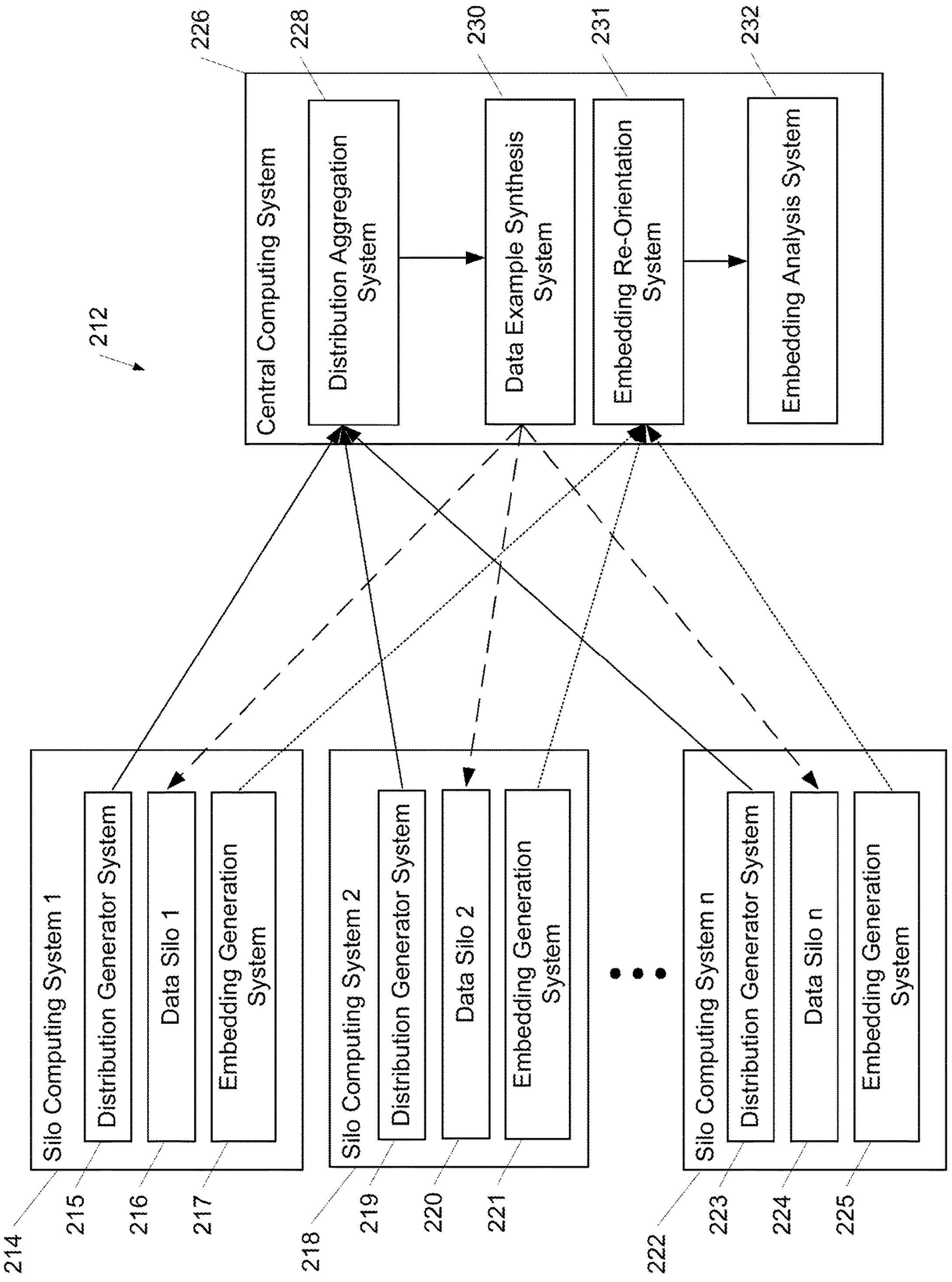
FIG. 2A depicts a block diagram of an example computing environment for generation of embeddings in a shared embedding space according to example embodiments of the present disclosure.

FIG. 2A depicts a more detailed block diagram of an example computing environment 212 for generation of embeddings in a shared embedding space according to example embodiments of the present disclosure. The computing environment 212 can include a central computing system 226 and a plurality of silo computing systems (e.g., silo computing systems 214, 218, and 222). Each silo computing system 214, 218, 222 can include, implement, or otherwise be associated with a particular data silo of a plurality of data silos 216, 220, 224.

Each silo computing system 214, 218, 222 can also include, implement, or otherwise be associated with a respective distribution generator system 215, 219, 223 and a respective embedding generation system 217, 221, 225. The central computing system 226 can include, implement, or otherwise be associated with a distribution aggregation system 228, a data example synthetic system 230, an embedding re-orientation system 231, and an embedding analysis system 232.

Each distribution generator system 215, 219, 223 can perform an analysis of the corresponding data silo 216, 220, 224 to generate data descriptive of the corresponding component feature-space of the corresponding data silo 216, 220, 224. For example, distribution generator system 215 can analyze the data examples stored in data silo 216 to generate the data descriptive of the component feature-space of data silo 216. Each distribution generator system 215, 219, 223 can transit this data to a distribution aggregation system 228 of the central computing system 226.

In particular, in some implementations, each distribution generator system 215, 219, 223 can generate data descriptive of a respective data distribution within the respective component feature-space of the corresponding data silo 216, 220, 224. For example, distribution generator system 215 can analyze the data examples stored in data silo 216 to generate the data descriptive of the respective data distribution of data silo 216.

The distribution generator system 215 can perform a number of different techniques to generate the data descriptive of the respective data distribution. For example, these techniques can include the generation of synthetic data that provides information about distribution of data within the data silo; but which does not reveal the underlying data itself. For example, the distribution generator system 215 can perform any of the classes of techniques described with reference to FIG. 1 for generating distribution data for a data silo.

Thus, in some implementations, the distribution generator system 215 can export feature-distributions (or synthetic data examples that are representative thereof) via a Differentially Private-learnt generative-model that infers complex feature-distributions.

The distribution aggregation system 228 can receive the data descriptive of the component feature-space from each of the distribution generator systems 215, 219, 223. The distribution aggregation system 228 can aggregate the plurality of different component feature-spaces to generate an aggregate feature-space. For example, in some implementations, the distribution aggregation system 228 can aggregate the data descriptive of the data distributions within the plurality of different component feature-spaces to generate an aggregate data distribution for the aggregate feature-space. The data example synthesis system 230 of the central computing system 226 can then generate a plurality of synthetic data examples having respective feature data within the aggregate feature-space generated by the distribution aggregation system 228.

The distribution aggregation system 228 and the data example synthesis system 230 can perform a number of different techniques to generate the aggregate feature-space and the synthetic data examples within the aggregate feature-space. As one example, the distribution aggregation system 228 can create a union of the received data. For example, the distribution aggregation system 228 can receive silo-specific synthetic data examples from each of the silo computing systems 214, 218, and 222 and aggregate them into an aggregated set of synthetic data examples.

In one example, the data example synthesis system 230 can sample (e.g., randomly) from the aggregated set of synthetic data examples to generate a plurality of synthetic data examples. In another example, the data example synthesis system 230 can train an additional generative model on the aggregated set of all silo-specific synthetic data examples and then use the additional generative model to generate the plurality of synthetic data examples. In yet another example, the aggregated set of all silo-specific synthetic data examples can serve as the plurality of synthetic data examples (e.g., no subsampling is performed).

Thus, in some implementations, the distribution aggregation system 228 and the data example synthesis system 230 can cooperate to generate synthetic data examples from the per-data-silo DP-generative-models learnt within each silo. The goal of generating the synthetic data examples in this way can be to faithfully mimic the aggregate-feature-distribution to a decent level of granularity, in order to make the synthetic data examples as close as possible to the original distribution within the silos.

The central computing system 226 can then transmit the synthetic data examples to the silo computing systems 214, 218, 222. Each silo computing system 214, 218, 222 can incorporate the received synthetic data examples into its corresponding data silo 216, 220, 224 for use in stabilizing the respective embedding spaces.

In particular, after receiving the synthetic data examples, each embedding generation system 217, 221, 225 can generate a respective set of embeddings for the items represented by data examples stored in the corresponding data silo 216, 220, 224. For example, embedding generation system 217 can generate embeddings for items represented by data examples stored in the data silo 216. For each data silo, the space can be stabilized using the synthetic data examples. Each embedding generation system 217, 221, 225 can perform various techniques to generate embeddings from the data in the corresponding data silo 216, 220, 224. Example techniques for generating embeddings include the use of a triplet loss, by training an autoencoder and using the intermediate representation as the embedding, by modifying (e.g., removing the final layer from) a classifier or other model trained on the data examples, and/or via other embedding generation techniques known in the art.

In some implementations, each embedding generation system 217, 221, 225 can then transmit the embeddings to the embedding re-orientation system 231. In some implementations, the embeddings can be subjected to a differential privacy approach (e.g., noise can be added) prior to transmission from each embedding generation system 217, 221, 225 to the embedding re-orientation system 231. Alternatively or additionally, in some implementations, the embeddings can be subjected to a pseudo-anonymization approach (e.g., item identifiers can be anonymized) prior to transmission from each embedding generation system 217, 221, 225 to the embedding re-orientation system 231. In other implementations, the embeddings are not shared with the central computing system 226, but instead other federated analysis techniques are performed on the distributed embeddings.

In implementations in which the embeddings are centrally shared, the embedding re-orientation system 231 can re-orient the respective received embedding-spaces via a machine-learning-based technique that minimizes the embedding-drift for the common examples (e.g., the synthetic examples transmitted at 314 and 316). For example, the embedding re-orientation system 231 can operate to align the learned embeddings for the synthetic examples. Specifically, in the process of trying to align the learned-embeddings of these common synthetic data examples, the embedding re-orientation system 231 is able to learn the different rotation or transformation function associated with each data silo. Once the rotation/transformation functions of each respective data-silo is learned, the embeddings of each data silo can be rotated/transformed by the embedding re-orientation system 231 using its respective learned rotation/transformation function to generate consistently-oriented versions of the embeddings from each silo. These consistently-oriented versions of the embeddings can be then used for the purpose of analytics on the consistently-oriented shared embedding space.

In particular, the embedding analysis system 232 can perform various forms of analysis on the embeddings received from the silo computing systems 214, 218, 222. As one example, the embedding analysis system 232 can perform same item (or same entity or same "actor") detection across two or more data silos. For example, the embedding analysis system 232 can identify, based on the embeddings received for at least a first data silo and a second data silo of the data silos, a first item and a second item that are attributable to a same actor, where the first item is represented by data within the first data silo and the second item is represented by data within the second data silo. For example, if the embeddings for the first item and the second item are within a threshold distance from each other, the items can be attributed to the same actor.

As another example, the embedding analysis system 232 can perform classification or label propagation across data from two or more data silos. For example, the embedding analysis system 232 can classify, based on the embeddings received for at least a first data silo and a second data silo of the data silos, a first item based on a label applied to a second item, where the first item is represented by data within the first data silo and the second item is represented by data within the second data silo. For example, if the embeddings for the first item and the second item are within a threshold distance from each other, then a label associated with the second item can be propagated or also applied to the first item.

As another example, the embedding analysis system 232 can perform cluster detection in the embedding space. For example, the embedding analysis system 232 can detect, based on the embeddings received for at least a first data silo and a second data silo of the data silos, an emerging dense cluster of embeddings associated with both the first data silo and the second data silo. Detection of an emerging dense cluster of embeddings can assist in quickly identifying new threats or attack surfaces in various information security use cases.

In yet another example, in some implementations, the actual embeddings themselves are not necessarily transmitted from each silo computing system to the central computing system 226, but instead only information about embedding density is transmitted (e.g., number of embeddings in a certain portion of the embedding space). This approach can result in increased privacy preservation while still enabling the central computing system 226 to perform operations such as detection of newly emerging dense embedding subspaces (e.g., which may be associated with or attributable to malicious actors). In particular, for differential privacy (DP)-based approaches to publishing/exporting data, it has been shown that the amount of DP-noise that is needed to be added when publishing individual points can be substantially reduced if aggregated-counts are published instead.

Exporting density information rather than the actual embeddings themselves can leverage this relationship. Further, the reporting of the density information can be done for embedding subspaces with pre-configurable granularity or some thresholding mechanism that ensures that the subspace contains at least some minimum number of points.

In some implementations, the density information (e.g., spatial density maps) can optionally be DP-noised by the silo computing systems prior to transmission to the central computing system 226. Adding DP-noise to the density information can have much better data-utility preservation as compared, for example, to DP-noising the individual embeddings themselves.

Each of the distribution generator systems 215, 219, 223, embedding generation systems 217, 221, 225, the distribution aggregation system 228, the data example synthesis system 230, and the embedding analysis system 232 can include computer logic utilized to provide desired functionality. Each of these systems can be implemented in hardware, firmware, and/or software controlling a general purpose processor. For example, in some implementations, each of these systems includes program files stored on a storage device, loaded into a memory and executed by one or more processors. In other implementations, each of these systems includes one or more sets of computer-executable instructions that are stored in a tangible computer-readable storage medium such as random access memory (RAM), hard disk, or optical or magnetic media.

Figure 2B:
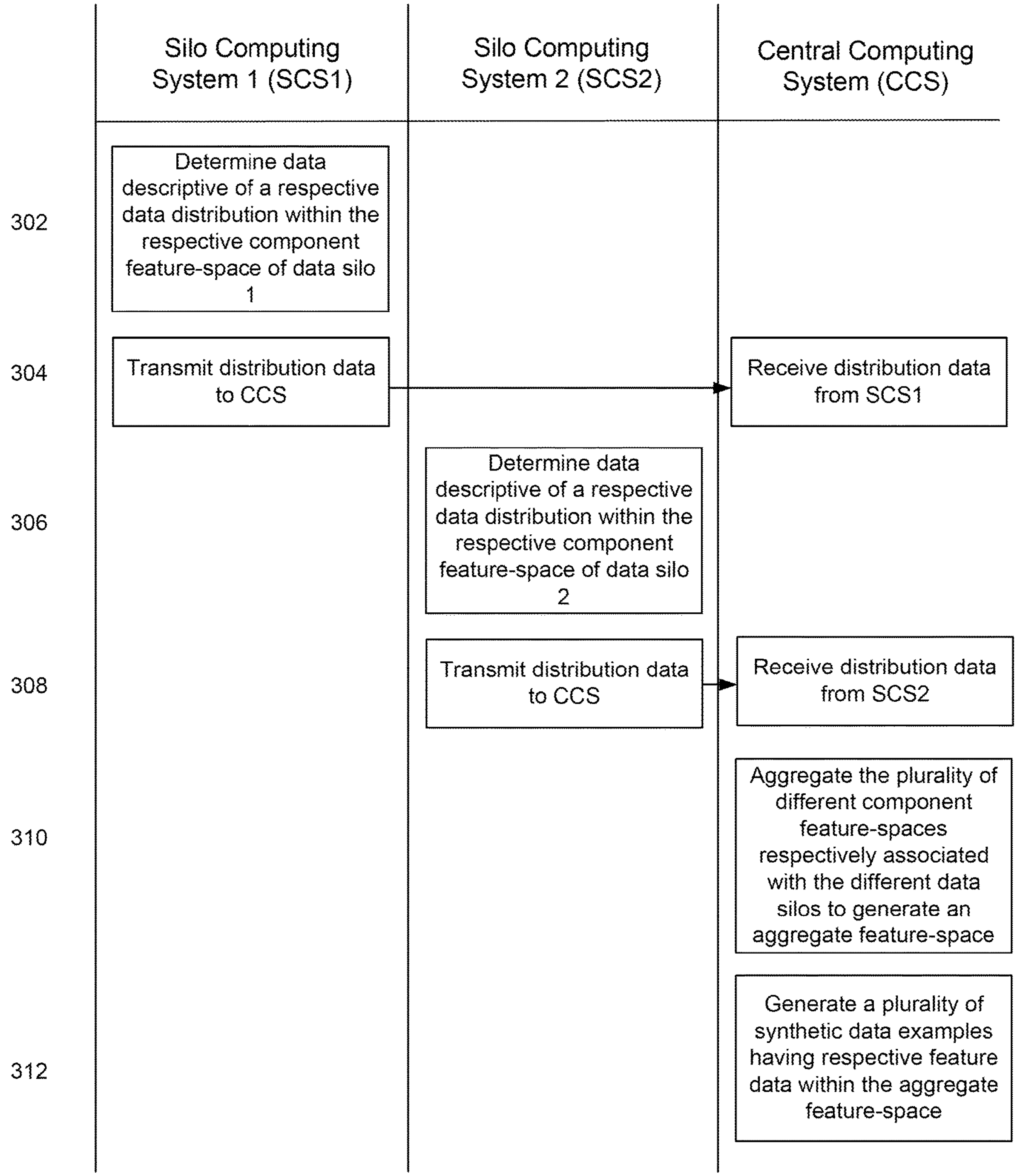
FIGS. 2B-2C depict a swim lane flow chart diagram of an example method for generation of embeddings in a shared embedding space according to example embodiments of the present disclosure.
Figure 2C:
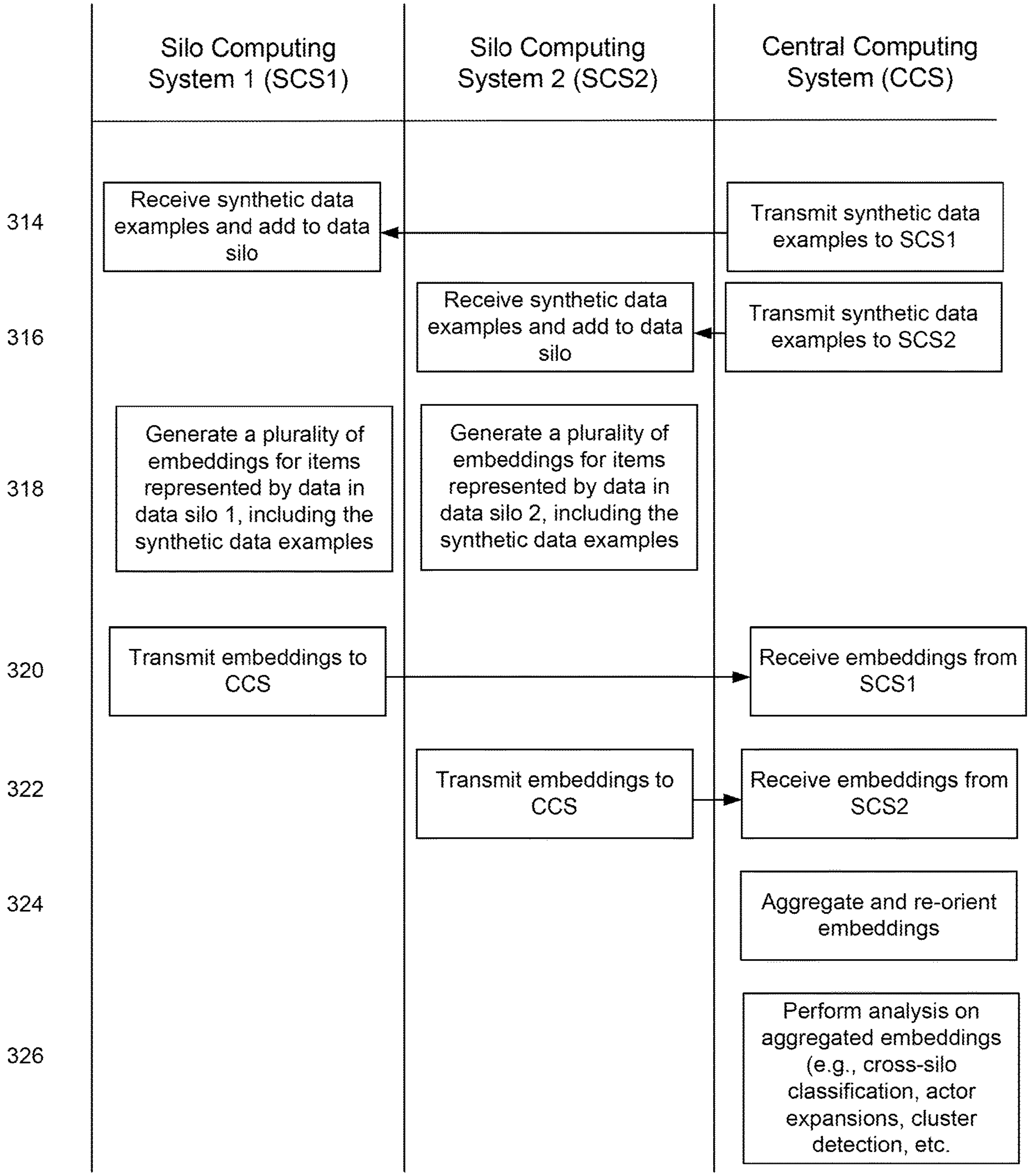

FIGS. 2B-2C depict a swim lane flow chart diagram of an example method for generation of embeddings in a shared embedding space according to example embodiments of the present disclosure. FIGS. 2B-C show operations respectively attributable to a silo computing system 1, a silo computing system 2, and a central computing system.

While FIGS. 2B-C will be discussed with reference to the example computing environment shown in FIG. 2A, the methods illustrated in FIGS. 2B-C can be implemented by other computing systems as well. Further, although FIGS. 2B-C are illustrated with reference to two silo computing systems for ease of reference, any number of silo computing systems can operate in a similar manner.

Referring first to FIG. 2B, at 302, the silo computing system 1 (SCS1) can determine data descriptive of a respective data distribution with the respective component feature-space of data silo 1. For example, the distribution generator system 215 of silo computing system 214 can generate distribution data for data silo 216 as described with reference to FIG. 2A. At 304, the SCS1 can transmit the distribution data to the central computing system (CCS). The CCS can receive the distribution data from the SCS1.

At 306, the silo computing system 2 (SCS2) can determine data descriptive of a respective data distribution with the respective component feature-space of data silo 2. For example, the distribution generator system 219 of silo computing system 218 can generate distribution data for data silo 220 as described with reference to FIG. 2A. At 308, the SCS2 can transmit the distribution data to the central computing system (CCS). The CCS can receive the distribution data from the SCS2.

At 310, the CCS can aggregate the plurality of different component feature-spaces respectively associated with the different data silos to generate an aggregate feature-space. For example, the distribution aggregation system 228 can generate the aggregate distribution as described with reference to FIG. 2A.

At 312, the CCS can generate a plurality of synthetic data examples having respective feature data within the aggregate feature-space. For example, the data example synthesis system 230 can generate data examples as described with reference to FIG. 2A.

Referring now to FIG. 2C, at 314, the CCS can transmit the synthetic data examples to the SCS1. The SCS1 can receive the synthetic data examples and add them to the data silo 1.

At 316, the CCS can transmit the synthetic data examples to the SCS2. The SCS2 can receive the synthetic data examples and add them to the data silo 2.

At 318, the SCS1 can generate a plurality of embeddings for items represented by data in data silo 1, including the synthetic data examples. For example, embedding generation system 217 can generate embeddings from or for the data contained in data silo 216.

Likewise, at 318, the SCS2 can generate a plurality of embeddings for items represented by data in data silo 2, including the synthetic data examples. For example, embedding generation system 221 can generate embeddings from or for the data contained in data silo 220.

In some implementations, at 318 the SCS1 and the SCS2 can add differential privacy (DP) noise to the embeddings to provide improved privacy. However, in some implementations, the SCS1 and the SCS2 do not add DP-noise to embeddings generated for the synthetic data examples, so that these embeddings can be later used to aggregate the embeddings together. Note that sharing the raw embeddings for the synthetic examples does not cause a privacy concern (e.g., as compared to sharing the raw-embeddings generated for the original data-items).

At 320, the SCS1 can transmit the embeddings to the CCS. The CCS can receive the embeddings from the SCS1. Likewise, at 322, the SCS2 can transmit the embeddings to the CCS. The CCS can receive the embeddings from the SCS2.

At 324, the CCS can aggregate and re-orient the embeddings. In particular, in some implementations, the CCS can re-orient the respective received embedding-spaces via a machine-learning-based technique that minimizes the embedding-drift for the common examples (e.g., the synthetic examples transmitted at 314 and 316). For example, the CCS can operate to align the learned embeddings for the synthetic examples. Specifically, in the process of trying to align the learned-embeddings of these common synthetic data examples, the CCS is able to learn the different rotation or transformation functions associated with each data silo. Once the rotation/transformation functions of each respective data-silo is learned, the embeddings of each data silo can be rotated/transformed using its respective learned rotation/transformation function to generate consistently-oriented versions of the embeddings from each silo. These consistently-oriented versions of the embeddings can be then used for the purpose of analytics on the consistently-oriented shared embedding space.

At 326, the CCS can perform analysis on the aggregated embeddings. For example, the embedding analysis system 232 can perform cross-silo classification, actor expansion, cluster detection, or other embedding-based analysis techniques as described with reference to FIG. 2A.

Figure 3A:
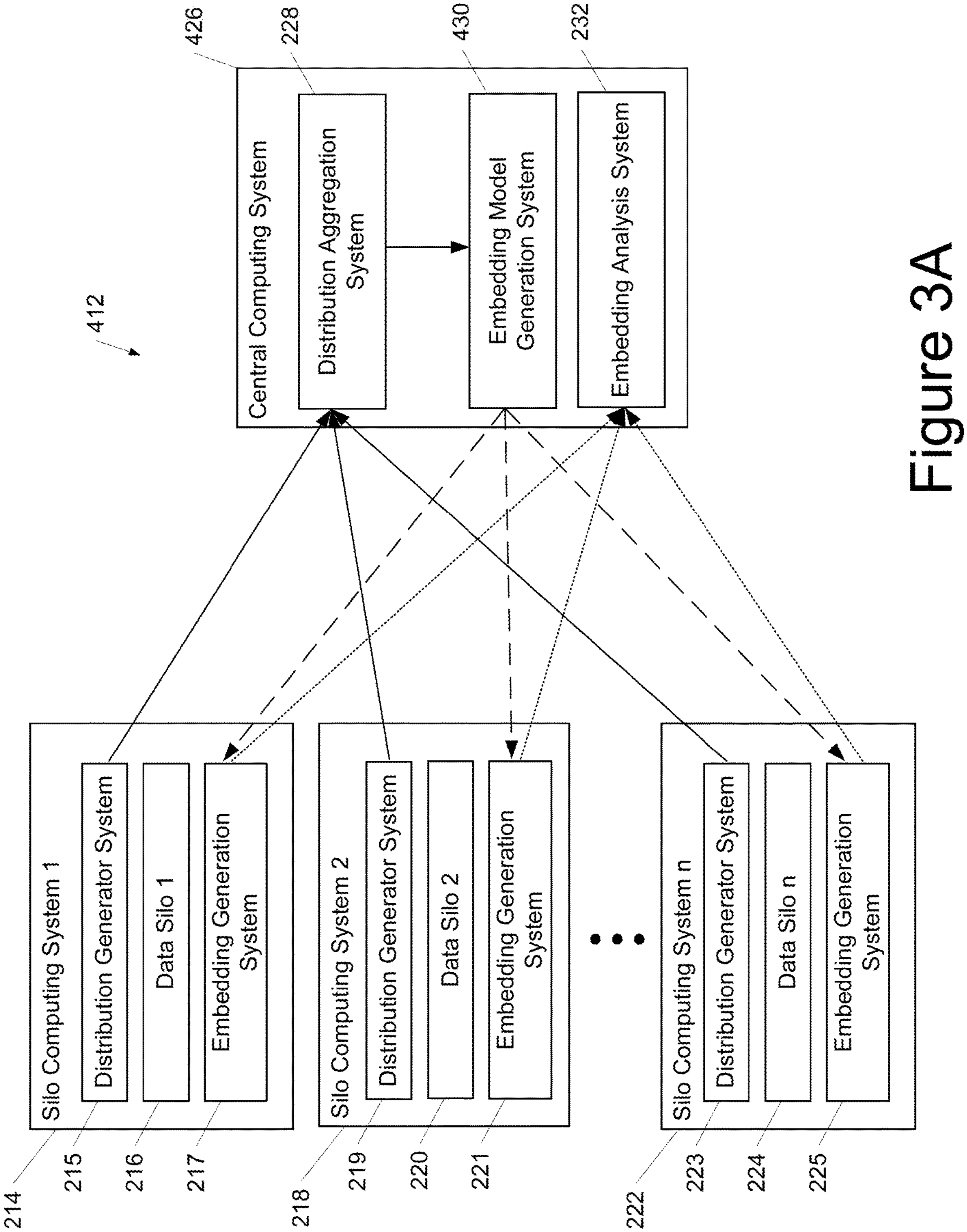
FIG. 3A depicts a block diagram of an example computing environment for generation of embeddings in a shared embedding space according to example embodiments of the present disclosure.

FIG. 3A depicts a block diagram of an example computing environment 412 for generation of embeddings in a shared embedding space according to example embodiments of the present disclosure. The example computing environment 412 is similar to the example computing environment 212 of FIG. 2A, with one exception that the central computing system 426 includes an embedding model generation system 430. The embedding model generation system 430 can generate an embedding model based on the aggregate feature-space data generated by the distribution aggregation system 228 (e.g., and/or by the data example synthesis system 230, which is not shown in FIG. 3A).

Example techniques for training an embedding generation model include the use of a triplet loss, by training an autoencoder and using the intermediate representation as the embedding, by modifying (e.g., removing the final layer from) a classifier or other model trained on the data examples, and/or via other embedding generation techniques known in the art.

The central computing system 426 can send the trained embedding generation model to each of the silo computing systems 214, 218, and 222. The respective embedding generation systems 217, 221, 225 for each system 214, 218, and 222 can generate embeddings for the data contained in the respective data silo 216, 220, 224. For example, embedding generation system 217 can generate embeddings or the data contained in data silo 216.

Another difference as compared to the system of FIG. 2A is that in FIG. 3A the central computing system 426 does not include an embedding re-orientation system. Because the same model is centrally trained and used to generate the embeddings at each silo computing system, the resulting embeddings will already be consistently-oriented and will not require re-orientation.

Figure 3B:
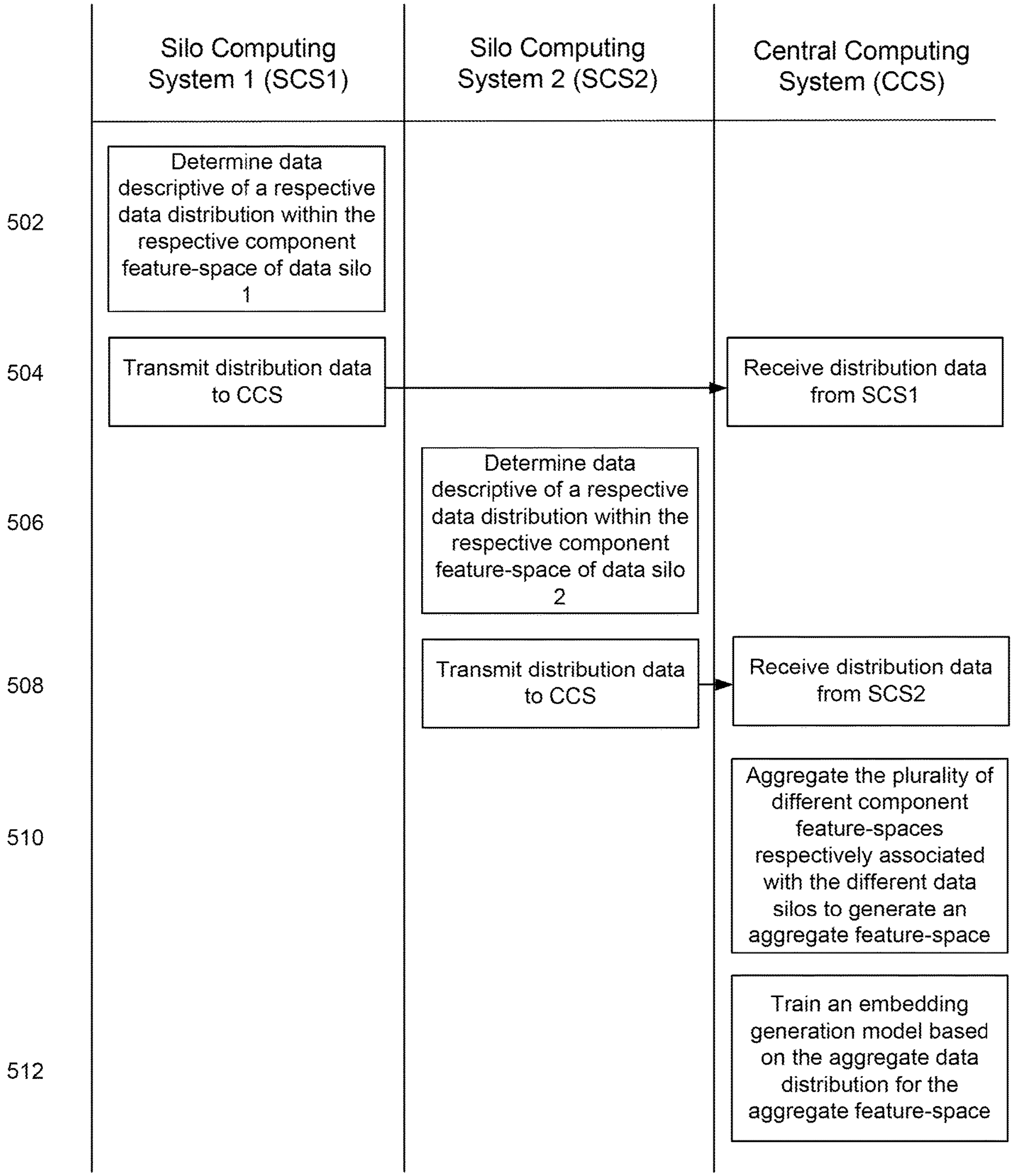
FIGS. 3B-3C depict a swim lane flow chart diagram of an example method for generation of embeddings in a shared embedding space according to example embodiments of the present disclosure.
Figure 3C:
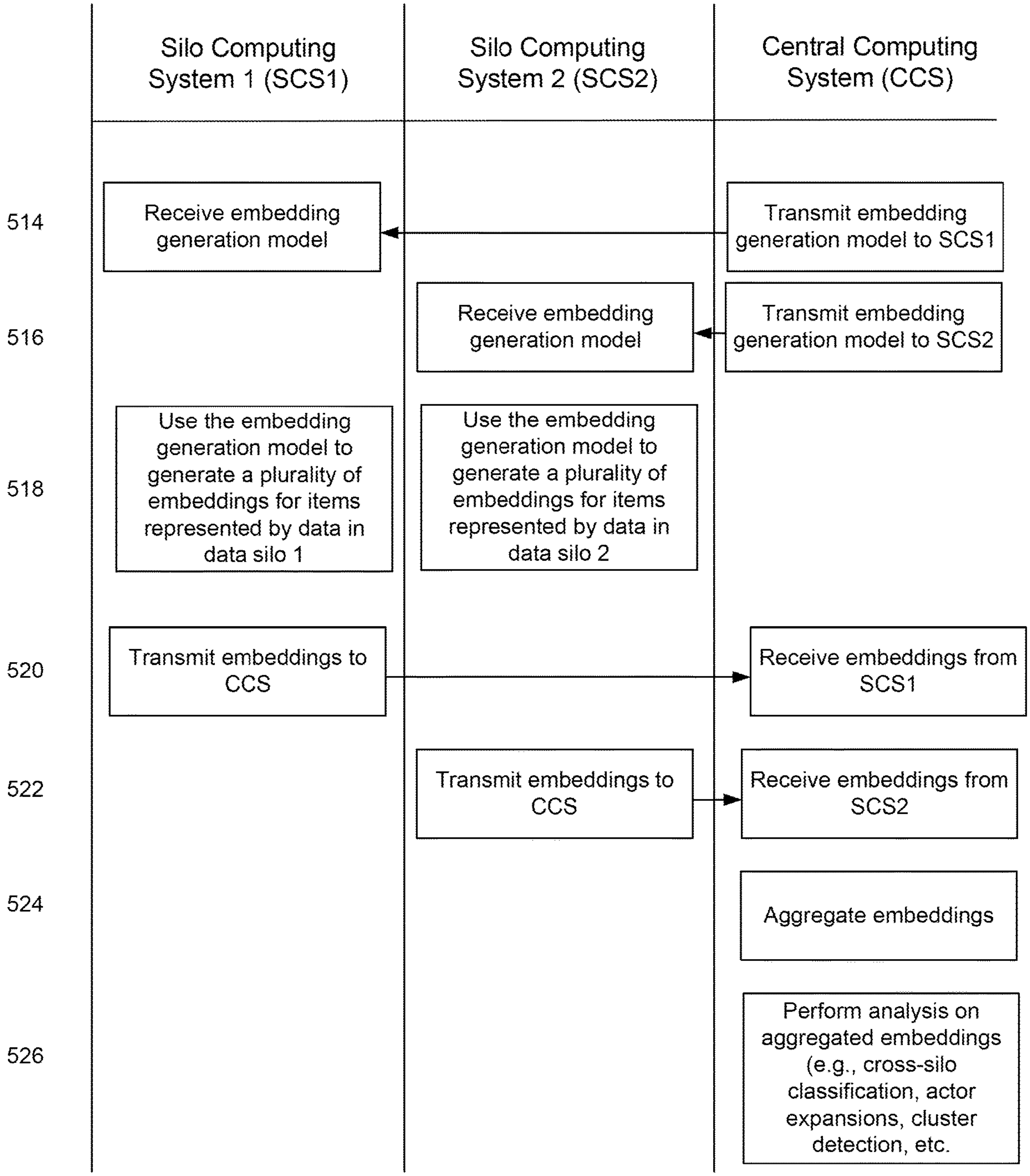

FIGS. 3B-3C depict a swim lane flow chart diagram of an example method for generation of embeddings in a shared embedding space according to example embodiments of the present disclosure. FIGS. 3B-C show operations respectively attributable to a silo computing system 1, a silo computing system 2, and a central computing system.

While FIGS. 3B-C will be discussed with reference to the example computing environment shown in FIG. 3A, the methods illustrated in FIGS. 3B-C can be implemented by other computing systems as well. Further, although FIGS. 3B-C are illustrated with reference to two silo computing systems for ease of reference, any number of silo computing systems can operate in a similar manner.

Referring first to FIG. 3B, at 502, the silo computing system 1 (SCS1) can determine data descriptive of a respective data distribution with the respective component feature-space of data silo 1. For example, the distribution generator system 215 of silo computing system 214 can generate distribution data for data silo 216 as described with reference to FIG. 2A. At 504, the SCS1 can transmit the distribution data to the central computing system (CCS). The CCS can receive the distribution data from the SCS1.

At 506, the silo computing system 2 (SCS2) can determine data descriptive of a respective data distribution with the respective component feature-space of data silo 2. For example, the distribution generator system 219 of silo computing system 218 can generate distribution data for data silo 220 as described with reference to FIG. 2A. At 508, the SCS2 can transmit the distribution data to the central computing system (CCS). The CCS can receive the distribution data from the SCS2.

At 510, the CCS can aggregate the plurality of different component feature-spaces respectively associated with the different data silos to generate an aggregate feature-space. For example, the distribution aggregation system 228 can generate the aggregate distribution as described with reference to FIG. 2A.

At 512, the CCS can train an embedding generation model based on the aggregate data distribution for the aggregate feature-space. For example, the embedding model generation system 430 can train the model as described with reference to FIG. 3A.

Referring now to FIG. 3C, at 514, the CCS can transmit the trained embedding generation model to the SCS1. The SCS1 can receive the trained embedding generation model.

At 516, the CCS can transmit the trained embedding generation model to the SCS2. The SCS2 can receive the trained embedding generation model.

At 518, the SCS1 can use the trained embedding generation model to generate a plurality of embeddings for items represented by data in data silo 1. For example, embedding generation system 217 can use the trained embedding generation model to generate embeddings from or for the data contained in data silo 216.

Likewise, at 518, the SCS2 can use the trained embedding generation model to generate a plurality of embeddings for items represented by data in data silo 2. For example, embedding generation system 221 can use the trained embedding generation model to generate embeddings from or for the data contained in data silo 220.

At 520, the SCS1 can transmit the embeddings to the CCS. The CCS can receive the embeddings from the SCS1. Likewise, at 522, the SCS2 can transmit the embeddings to the CCS. The CCS can receive the embeddings from the SCS2.

At 524, the CCS can aggregate the embeddings. At 524, aggregating the embeddings may simply include combining the embeddings into a single data structure or representation. Namely, for example as compared to other approaches described herein, because the same model is centrally trained and used to generate the embeddings at each silo computing system, the resulting embeddings will already be consistently-oriented and will not require re-orientation.

At 526, the CCS can perform analysis on the aggregated embeddings. For example, the embedding analysis system 252 can perform cross-silo classification, actor expansion, cluster detection, or other embedding-based analysis techniques as described with reference to FIG. 2A.

Figure 4:
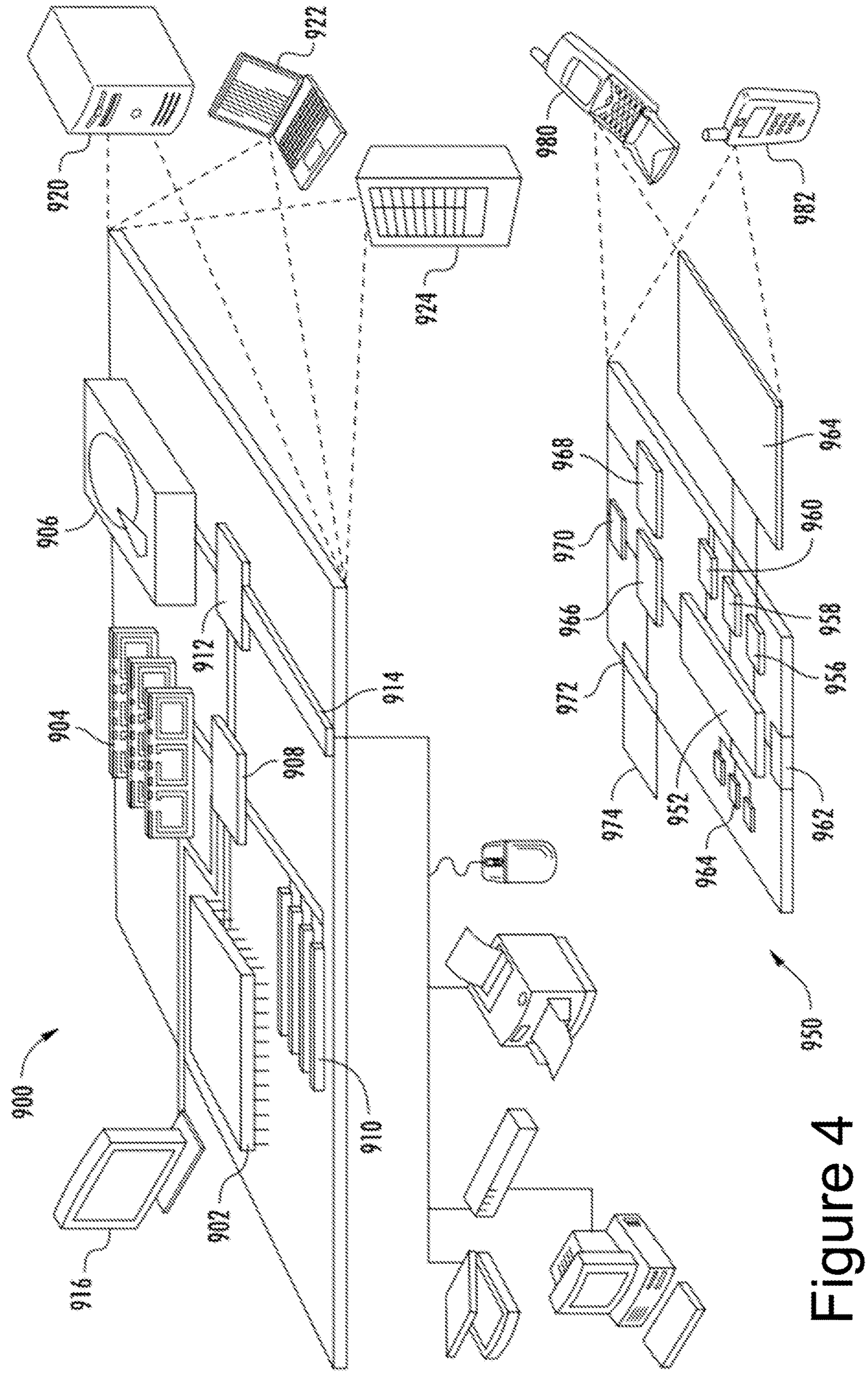
FIG. 4 depicts an example computing device according to example embodiments of the present disclosure.

FIG. 4 illustrates a block diagram of non-limiting examples of computing devices 900, 950 that may be used to implement the systems and methods described in this document, as either a client or as a server or plurality of servers. Computing device 900 is intended to represent various forms of digital computers, such as laptops, desktops, workstations, personal digital assistants, servers, blade servers, mainframes, and other appropriate computers.

Computing device 950 is intended to represent various forms of mobile devices, such as personal digital assistants, cellular telephones, smartphones, and other similar computing devices. The components shown here, their connections and relationships, and their functions, are meant to be illustrative only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low-speed interface 912 connecting to low-speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to perform any of the techniques described herein and/or to display graphical information for a GUI on an external input/output device, such as display 916 coupled to high-speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a computer-readable medium. The computer-readable medium is not a propagating signal. In one implementation, the memory 904 is a volatile memory unit or units. In another implementation, the memory 904 is a non-volatile memory unit or units.

The storage device 906 is capable of providing mass storage for the computing device 900. In one implementation, the storage device 906 is a computer-readable medium. In various different implementations, the storage device 906 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods or techniques, such as those described above. The information carrier is a computer- or machine-readable medium, such as the memory 904, the storage device 906, or memory on processor 902.

The high-speed controller 908 manages bandwidth intensive operations for the computing device 900, while the low-speed controller 912 manages lower bandwidth-intensive operations. Such allocation of duties is illustrative only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports which may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can process instructions for execution within the computing device 950, including instructions stored in the memory 964. The processor may also include separate analog and digital processors. The processor may provide, for example, for coordination of the other components of the device 950, such as control of user interfaces, applications run by device 950, and wireless communication by device 950.

Processor 952 may communicate with a user through control interface 958 and display interface 959 coupled to a display 954. The display 954 may be, for example, a TFT LCD display or an OLED display, or other appropriate display technology. The display interface 959 may comprise appropriate circuitry for driving the display 954 to present graphical and other information to a user. The control interface 958 may receive commands from a user and convert them for submission to the processor 952. In addition, an external interface 962 may be provided in communication with processor 952, so as to enable near area communication of device 950 with other devices. External interface 962 may provide, for example, for wired communication (e.g., via a docking procedure) or for wireless communication (e.g., via Bluetooth or other such technologies).

The memory 964 stores information within the computing device 950. In one implementation, the memory 964 is a computer-readable medium. In one implementation, the memory 964 is a volatile memory unit or units. In another implementation, the memory 964 is a non-volatile memory unit or units. Expansion memory 974 may also be provided and connected to device 950 through expansion interface 972, which may include, for example, an external card interface. Such expansion memory 974 may provide extra storage space for device 950, or may also store applications or other information for device 950. Specifically, expansion memory 974 may include instructions to carry out or supplement the processes described above and may include secure information also. Thus, for example, expansion memory 974 may be provided as a security module for device 950 and may be programmed with instructions that permit secure use of device 950.

The memory may include for example, flash memory and/or MRAM memory, as discussed below. In one implementation, a computer program product is tangibly embodied in an information carrier. The computer program product contains instructions that, when executed, perform one or more methods, such as those described above and/or illustrated in FIGS. 2B-C. The information carrier is a computer- or machine-readable medium, such as the memory 964, expansion memory 974, or memory on processor 952. Device 950 may communicate wirelessly through communication interface 966, which may include digital signal processing circuitry where necessary. Such communication may occur, for example, through radio-frequency transceiver 968. In addition, GPS receiver module 970 may provide additional wireless data to device 950, which may be used as appropriate by applications running on device 950.

Device 950 may also communicate audibly using audio codec 960, which may receive spoken information from a user and convert it to usable digital information. Audio codex 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interactions with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that include a front-end component (e.g., a client computer having a graphical user interface or a Web browser through which a user can interact with an implementation of the systems and techniques described here), or any combination of such backend, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method to facilitate privacy-preserving learning of embeddings, the method comprising:

receiving, by a central computing system comprising one or more computing devices, data descriptive of a respective data distribution within each of a plurality of different component feature-spaces that are respectively associated with a plurality of different and separate data silos;

aggregating, by the central computing system, the data descriptive of the data distributions within the plurality of different component feature-spaces to generate an aggregate data distribution for an aggregate feature-space;

sampling, by the central computing system, from the aggregate data distribution for the aggregate feature-space to generate a plurality of synthetic data examples having respective feature data within the aggregate feature-space; and providing, by the central computing system, the plurality of synthetic data examples to a plurality of silo computing systems respectively associated with the plurality of different and separate data silos for use in generation, by the silo computing systems, of embeddings having a stabilized and consistent orientation within a shared embedding space.

2. The computer-implemented method of claim 1, wherein, for each of the plurality of different and separate data silos, the data descriptive of the respective data distribution comprises a respective plurality of silo-specific synthetic data examples that are representative of the respective data distribution in the corresponding data silo.

3. The computer-implemented method of claim 2, wherein, for each of the plurality of different and separate data silos, the respective plurality of silo-specific synthetic data examples have been generated by a corresponding differentially-private generative model trained on data included in the corresponding data silo.

4. The computer-implemented method of claim 1, further comprising:

receiving, by the central computing system from each silo computing system, a respective plurality of embeddings in the shared embedding space, the respective plurality of embeddings received from each silo computing system having been generated for respective items represented by data within the corresponding data silo based on the data stored within the corresponding data silo.

5. The computer-implemented method of claim 4, further comprising:

identifying, by the central computing system and based on the embeddings received for at least a first data silo and a second data silo of the data silos, a first item and a second item that are attributable to a same actor, the first item being represented by data within the first data silo and the second item being represented by data within the second data silo.

6. The computer-implemented method of claim 4, further comprising:

classifying, by the central computing system and based on the embeddings received for at least a first data silo and a second data silo of the data silos, a first item based on a label applied to a second item, the first item being represented by data within the first data silo and the second item being represented by data within the second data silo.

7. The computer-implemented method of claim 4, further comprising:

detecting, by the central computing system and based on the embeddings received for at least a first data silo and a second data silo of the data silos, an emerging dense cluster of embeddings.

8. The computer-implemented method of claim 4, wherein the respective plurality of embeddings received from at least one of the data silos comprise differentially-private embeddings.

9. The computer-implemented method of claim 1, wherein the plurality of different and separate data silos correspond to user data fragmented in entity-space.

10. The computer-implemented method of claim 1, wherein providing, by the central computing system, the plurality of synthetic data examples to the plurality of silo computing systems respectively associated with the plurality of different and separate data silos comprises providing, by the central computing system, to each silo computing system, only the respective portion of each synthetic data example that contains data within the corresponding component feature-space associated with the silo computing system.

11. A silo computing system comprising one or more computing devices configured to perform operations, the operations comprising determining data descriptive of a data distribution within a component feature-space of a data silo associated with the silo computing system, wherein the data silo stores a collection of data examples associated with one or more entities;

transmitting the data descriptive of respective data distribution to a central computing system for use in generating an aggregate feature-space, wherein the aggregate feature-space comprises an aggregation of the component feature-space with one or more other component feature-spaces of one or more different data silos that are separate from the data silo;

receiving a plurality of synthetic data examples having respective feature data within the aggregate feature-space; and generating one or more embeddings respectively for the one or more entities based at least in part on the collection of data examples and the plurality of synthetic data examples, the one or more embeddings having a stabilized and consistent orientation within a shared embedding space.

12. The silo computing system of claim 11, wherein the operations further comprise:

transmitting the one or more embeddings to the central computing system.

13. The silo computing system of claim 12, wherein the operations further comprise:

performing a differential privacy technique on the one or more embeddings prior to transmitting the one or more embeddings to the central computing system.

14. The silo computing system of claim 12, wherein the operations further comprise:

anonymizing one or more item identifiers associated with the one or more embeddings prior to transmitting the one or more embeddings to the central computing system.

15. The silo computing system of claim 11, wherein:

determining data descriptive of the data distribution within the component feature-space of the data silo associated with the silo computing system comprises generating a respective plurality of silo-specific synthetic data examples that are representative of the respective data distribution in the corresponding data silo.

16. The silo computing system of claim 14, wherein generating the respective plurality of silo-specific synthetic data examples comprises using a differentially-private generative model trained on data included in the corresponding data silo to generate the respective plurality of silo-specific synthetic data.

17. The silo computing system of claim 11, wherein the operations further comprise:

transmitting data to the central computing system that describes a spatial density associated with the one or more embeddings generated for the one or more entities represented by the data examples stored in the data silo.

18. A central computing system implemented by one or more computing devices, the central computing system configured to perform operations, the operations comprising:

receiving, by a central computing system comprising one or more computing devices, data descriptive of a respective data distribution within each of a plurality of different component feature-spaces that are respectively associated with a plurality of different and separate data silos;

aggregating, by the central computing system, the data descriptive of the data distributions within the plurality of different component feature-spaces to generate an aggregate data distribution for an aggregate feature-space;

training, by the central computing system, an embedding generation model based on the aggregate data distribution for the aggregate feature-space; and providing, by the central computing system, the embedding generation model to a plurality of silo computing systems respectively associated with the plurality of different and separate data silos for use in generation, by the silo computing systems, of embeddings having a stabilized and consistent orientation within a shared embedding space.

19. The central computer system of claim 18, wherein, for each of the plurality of different and separate data silos, the data descriptive of the respective data distribution comprises a respective plurality of silo-specific synthetic data examples that are representative of the respective data distribution in the corresponding data silo.

20. The central computer system of claim 19, wherein, for each of the plurality of different and separate data silos, the respective plurality of silo-specific synthetic data examples have been generated by a corresponding differentially-private generative model trained on data included in the corresponding data silo.

21. The central computer system of claim 18, further comprising:

receiving, by the central computing system from each silo computing system, a respective plurality of embeddings in the shared embedding space, the respective plurality of embeddings received from each silo computing system having been generated for respective items represented by data within the corresponding data silo by applying the embedding generation model to the data stored within the corresponding data silo.

22. A silo computing system comprising one or more computing devices configured to perform operations, the operations comprising determining data descriptive of a data distribution within a component feature-space of a data silo associated with the silo computing system, wherein the data silo stores a collection of data examples associated with one or more entities;

transmitting the data descriptive of respective data distribution to a central computing system for use in generating an aggregate feature-space, wherein the aggregate feature-space comprises an aggregation of the component feature-space with one or more other component feature-spaces of one or more different data silos that are separate from the data silo;

receiving an embedding generation model trained using the aggregate feature-space; and generating one or more embeddings respectively for the one or more entities by applying the embedding generation model to the collection of data examples stored in the data silo, the one or more embeddings having a stabilized and consistent orientation within a shared embedding space.

* * * * *